(12) United States Patent
Wen et al.

(10) Patent No.: US 10,237,748 B2
(45) Date of Patent: Mar. 19, 2019

(54) METHOD, SYSTEM, AND DEVICE FOR DOWNLINK TRANSMISSION

(71) Applicant: Huawei Technologies Co., Ltd., Shenzhen (CN)

(72) Inventors: Ronghui Wen, Beijing (CN); Mingyu Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 266 days.

(21) Appl. No.: 15/203,940

(22) Filed: Jul. 7, 2016

(65) Prior Publication Data

US 2016/0316376 A1 Oct. 27, 2016

Related U.S. Application Data

(63) Continuation of application No. PCT/CN2014/070246, filed on Jan. 7, 2014.

(51) Int. Cl.
*H04W 16/14* (2009.01)
*H04L 27/26* (2006.01)
*H04W 16/06* (2009.01)
*H04W 72/08* (2009.01)
*H04W 72/04* (2009.01)
*H04L 5/14* (2006.01)
*H04W 84/04* (2009.01)

(52) U.S. Cl.
CPC ......... *H04W 16/14* (2013.01); *H04L 27/2605* (2013.01); *H04W 16/06* (2013.01); *H04W 72/082* (2013.01); *H04L 5/14* (2013.01); *H04W 72/0453* (2013.01); *H04W 84/042* (2013.01)

(58) Field of Classification Search
None
See application file for complete search history.

(56) References Cited

U.S. PATENT DOCUMENTS 8,803,635 B1 * 8/2014 Ashworth ............... H01P 1/213
333/126
2011/0019634 A1 * 1/2011 Fujii .................... H04W 16/14
370/329

(Continued)

FOREIGN PATENT DOCUMENTS

CN 101155385 A 4/2008
CN 102595425 A 7/2012

(Continued)

OTHER PUBLICATIONS

Partial English Translation and Abstract of Chinese Patent Application No. CN102595425, Jul. 28, 2016, 7 pages.

(Continued)

*Primary Examiner* — Kenny S Lin
(74) *Attorney, Agent, or Firm* — Conley Rose, P.C.

(57) ABSTRACT

A method, system, and device for downlink transmission. A downlink signal is sent to a UE in an available frequency band of an uplink frequency band, and no signal is sent or received in a guard frequency band of the uplink frequency band, where the guard frequency band is located in a highest-frequency part and/or a lowest-frequency part of the uplink frequency band. Because no signal is sent or received in the guard frequency band of the uplink frequency band, interference to communication of a UE in an adjacent frequency band is reduced when the uplink frequency band is occupied for downlink transmission, thereby improving system performance.

20 Claims, 4 Drawing Sheets

(56) References Cited

U.S. PATENT DOCUMENTS

| | | | | |
|---|---|---|---|---|
| 2011/0194468 A1* | 8/2011 | Mehrotra | ............... | H04W 16/14 370/277 |
| 2013/0229955 A1* | 9/2013 | Xu | ........................ | H04W 52/18 370/280 |
| 2014/0274193 A1* | 9/2014 | Ashworth | ............. | H04W 52/52 455/522 |
| 2015/0029909 A1* | 1/2015 | Ashworth | .......... | H04B 7/15535 370/279 |
| 2016/0057746 A1* | 2/2016 | Drucker | ............... | H04B 7/2615 370/280 |

FOREIGN PATENT DOCUMENTS

| | | |
|---|---|---|
| EP | 1193988 B1 | 4/2002 |
| EP | 2252098 A1 | 11/2010 |
| JP | 2002112326 A | 4/2002 |

OTHER PUBLICATIONS

Foreign Communication From a Counterpart Application, European Application No. 14877997.8, Extended European Search Report dated Nov. 3, 2016, 8 pages.

Foreign Communication From a Counterpart Application, PCT Application No. PCT/CN2014/070246, English Translation of International Search Report dated Oct. 10, 2014, 2 pages.

Foreign Communication Form a Counterpart Application, PCT Application No. PCT/CN2014/070246, English Translation of Written Opinion dated Oct. 10, 2014, 7 pages.

Foreign Communication From a Counterpart Application, Japanese Application No. 2016544835, Japanese Office Action dated Oct. 3, 2017, 3 pages.

Foreign Communication From a Counterpart Application, Japanese Application No. 2016544835, English Translation of Japanese Office Action dated Oct. 3, 2017, 3 pages.

* cited by examiner

METHOD, SYSTEM, AND DEVICE FOR DOWNLINK TRANSMISSION

CROSS-REFERENCE TO RELATED APPLICATIONS

This application is a continuation of international application number PCT/CN2014/070246 filed on Jan. 7, 2014, which is incorporated by reference.

TECHNICAL FIELD

This application relates to the field of wireless communications technologies, and in particular, to a method, system, and device for downlink transmission.

BACKGROUND

Long-Term Evolution (LTE) is an evolution of third-generation mobile telecommunications technology (3G), and is generally referred to as 3.9G. LTE is an international general standard that is based on an orthogonal frequency-division multiple access (OFDMA) technology and is formulated by the 3rd Generation Partnership Project (3GPP) organization, and includes two modes: frequency-division duplexing (FDD) and time-division duplexing (TDD) that are used for paired spectrum and unpaired spectrum. There is only a relatively small difference between FDD and TDD in the LTE standard, and the similarity between the two modes reaches 90%.

LTE to which the FDD mode is applied is FDD-LTE. As a requirement for LTE, evolution of a TDD system is synchronous to evolution of an FDD system.

The FDD mode is characterized in that receiving and transmission are performed in two separated (with an interval of 190 megahertz (MHz) between uplink and downlink frequencies) symmetrical frequency channels.

In an LTE-FDD system, uplink and downlink resources occupy a same bandwidth, but uplink and downlink services are not necessarily symmetrical. If downlink services are more than uplink services, resource waste may be caused. A station with a large demand for downlink services may transmit downlink data by using an idle uplink frequency band, so as to make full use of resources.

Figure 1:
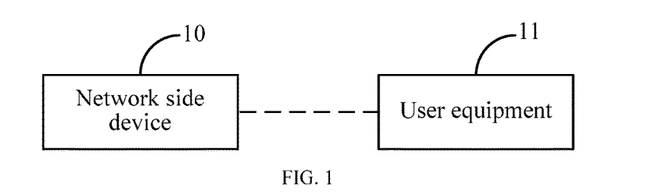
FIG. 1 is a schematic structural diagram of a system for downlink transmission according to Embodiment 1 of this application.

However, a total transmit power of a base station is generally higher than a bandwidth occupied by a user equipment (UE), and therefore, if the base station directly sends a downlink signal in the entire uplink frequency band, it may be caused that signal strength leaked from the downlink signal to an adjacent frequency band is higher than an interference tolerance threshold of the adjacent frequency band (as shown in FIG. 1), causing severe interference to communication of a UE in the adjacent frequency band.

In conclusion, at present, when an uplink frequency band is occupied for downlink transmission, severe interference to communication of a UE in an adjacent frequency band may be caused.

SUMMARY

This application provides a method, system and device for downlink transmission, which are used to solve a problem in prior approaches that severe interference to communication of a UE in an adjacent frequency band may be caused when an uplink frequency band is occupied for downlink transmission.

According to a first aspect, a method for downlink transmission is provided, including: determining, by a network side device, an uplink frequency band that includes a guard frequency band and an available frequency band and is used for downlink transmission; and sending, by the network side device, a downlink signal to a UE in the available frequency band, and sending or receiving no signal in the guard frequency band, where the guard frequency band is located in a highest-frequency part and/or a lowest-frequency part of the uplink frequency band.

With reference to the first aspect, in a first possible implementation manner, if the uplink frequency band used for downlink transmission is not adjacent to another uplink frequency band used for downlink transmission, the highest-frequency part and the lowest-frequency part of the uplink frequency band each has one guard frequency band; if the uplink frequency band used for downlink transmission is adjacent to another uplink frequency band used for downlink transmission, and the uplink frequency band is a highest frequency band of all adjacent uplink frequency bands, the highest-frequency part of the uplink frequency band has one guard frequency band; or if the uplink frequency band used for downlink transmission is adjacent to another uplink frequency band used for downlink transmission, and the uplink frequency band is a lowest frequency band of all adjacent uplink frequency bands, the lowest-frequency part of the uplink frequency band has one guard frequency band.

With reference to the first aspect or the first possible implementation manner of the first aspect, in a second possible implementation manner, the network side device determines a bandwidth of the guard frequency band and a bandwidth of the available frequency band in the uplink frequency band according to the following manner: if the uplink frequency band has two guard frequency bands, determining, by the network side device, a bandwidth in the uplink frequency band except a bandwidth double a minimum bandwidth value of the guard frequency band, to be a maximum value of the available frequency band, selecting, from all frequency bandwidths that can be supported by a system, a frequency bandwidth no greater than the maximum value of the available frequency band as the bandwidth of the available frequency band, and using a half of a bandwidth in the uplink frequency band except the bandwidth of the available frequency band as the bandwidth of the guard frequency band; or if the uplink frequency band has one guard frequency band, determining, by the network side device, a bandwidth in the uplink frequency band except a bandwidth with a minimum bandwidth value of the guard frequency band, to be a maximum value of the available frequency band, selecting, from all frequency bandwidths that can be supported by a system, a frequency bandwidth no greater than the maximum value of the available frequency band as the bandwidth of the available frequency band, and using a bandwidth in the uplink frequency band except the bandwidth of the available frequency band as the bandwidth of the guard frequency band.

With reference to any one of the first aspect, the first possible implementation manner of the first aspect, and the second possible implementation manner of the first aspect, in a third possible implementation manner, after the determining, by a network side device, an uplink frequency band that includes a guard frequency band and an available frequency band and is used for downlink transmission, the method further includes: scheduling, by the network side device, the UE, and transmitting uplink control information and/or a reference signal in another uplink frequency band except the uplink frequency band used for downlink transmission.

With reference to any one of the first aspect, the first possible implementation manner of the first aspect, and the second possible implementation manner of the first aspect, in a fourth possible implementation manner, after the determining, by a network side device, an uplink frequency band that includes a guard frequency band and an available frequency band and is used for downlink transmission, the method further includes: when scheduling information of a downlink signal is transported in the uplink frequency band, sending, by the network side device, information according to a payload size (payload size) corresponding to the determined width of the available frequency band.

According to a second aspect, a method for downlink transmission is provided, where the method includes: determining, by a UE, an uplink frequency band that includes a guard frequency band and an available frequency band and is used for downlink transmission; and receiving, by the UE, in the available frequency band, a downlink signal sent by a network side device, and sending or receiving no signal in the guard frequency band, where the guard frequency band is located in a highest-frequency part and/or a lowest-frequency part of the uplink frequency band.

With reference to the second aspect, in a first possible implementation manner, if the uplink frequency band used for downlink transmission is not adjacent to another uplink frequency band used for downlink transmission, the highest-frequency part and the lowest-frequency part of the uplink frequency band each has one guard frequency band; if the uplink frequency band used for downlink transmission is adjacent to another uplink frequency band used for downlink transmission, and the uplink frequency band is a highest frequency band of all adjacent uplink frequency bands, the highest-frequency part of the uplink frequency band has one guard frequency band; or if the uplink frequency band used for downlink transmission is adjacent to another uplink frequency band used for downlink transmission, and the uplink frequency band is a lowest frequency band of all adjacent uplink frequency bands, the lowest-frequency part of the uplink frequency band has one guard frequency band.

With reference to the second aspect or the first possible implementation manner of the second aspect, in a second possible implementation manner, the UE determines a bandwidth of the guard frequency band and a bandwidth of the available frequency band in the uplink frequency band according to the following manner: if the uplink frequency band has two guard frequency bands, determining, by the network side device, a bandwidth in the uplink frequency band except a bandwidth double a minimum bandwidth value of the guard frequency band, to be a maximum value of the available frequency band, selecting, from all frequency bandwidths that can be supported by a system, a frequency bandwidth no greater than the maximum value of the available frequency band as the bandwidth of the available frequency band, and using a half of a bandwidth in the uplink frequency band except the bandwidth of the available frequency band as the bandwidth of the guard frequency band; or if the uplink frequency band has one guard frequency band, determining, by the network side device, a bandwidth in the uplink frequency band except a bandwidth with a minimum bandwidth value of the guard frequency band, to be a maximum value of the available frequency band, selecting, from all frequency bandwidths that can be supported by a system, a frequency bandwidth no greater than the maximum value of the available frequency band as the bandwidth of the available frequency band, and using a bandwidth in the uplink frequency band except the bandwidth of the available frequency band as the bandwidth of the guard frequency band.

With reference to any one of the second aspect, the first possible implementation manner of the second aspect, and the second possible implementation manner of the second aspect, in a third possible implementation manner, after the determining, by a UE, an uplink frequency band that includes a guard frequency band and an available frequency band and is used for downlink transmission, the method further includes: transmitting, by the UE according to scheduling of the network side device, uplink control information and/or a reference signal in another uplink frequency band except the uplink frequency band used for downlink transmission.

With reference to any one of the second aspect, the first possible implementation manner of the second aspect, and the second possible implementation manner of the second aspect, in a fourth possible implementation manner, after the determining, by a UE, an uplink frequency band that includes a guard frequency band and an available frequency band and is used for downlink transmission, the method further includes: when scheduling information of a downlink signal is transported in the uplink frequency band, receiving, by the UE, information according to a payload size (payload size) corresponding to the determined width of the available frequency band.

According to a third aspect, a network side device for downlink transmission is provided, where the network side device includes: a determining module configured to determine an uplink frequency band that includes a guard frequency band and an available frequency band and is used for downlink transmission; and a transmission module configured to send a downlink signal to a UE in the available frequency band, and send or receive no signal in the guard frequency band, where the guard frequency band is located in a highest-frequency part and/or a lowest-frequency part of the uplink frequency band.

With reference to the third aspect, in a first possible implementation manner, if the uplink frequency band used for downlink transmission is not adjacent to another uplink frequency band used for downlink transmission, the highest-frequency part and the lowest-frequency part of the uplink frequency band each has one guard frequency band; if the uplink frequency band used for downlink transmission is adjacent to another uplink frequency band used for downlink transmission, and the uplink frequency band is a highest frequency band of all adjacent uplink frequency bands, the highest-frequency part of the uplink frequency band has one guard frequency band; or if the uplink frequency band used for downlink transmission is adjacent to another uplink frequency band used for downlink transmission, and the uplink frequency band is a lowest frequency band of all adjacent uplink frequency bands, the lowest-frequency part of the uplink frequency band has one guard frequency band.

With reference to the third aspect or the first possible implementation manner of the third aspect, in a second possible implementation manner, the determining module is specifically configured to determine a bandwidth of the guard frequency band and a bandwidth of the available frequency band in the uplink frequency band according to the following manner: if the uplink frequency band has two guard frequency bands, determining, by the network side device, a bandwidth in the uplink frequency band except a bandwidth double a minimum bandwidth value of the guard frequency band, to be a maximum value of the available frequency band, selecting, from all frequency bandwidths that can be supported by a system, a frequency bandwidth no greater than the maximum value of the available frequency band as the bandwidth of the available frequency band, and using a half of a bandwidth in the uplink frequency band except the bandwidth of the available frequency band as the bandwidth of the guard frequency band; or if the uplink frequency band has one guard frequency band, determining, by the network side device, a bandwidth in the uplink frequency band except a bandwidth with a minimum bandwidth value of the guard frequency band, to be a maximum value of the available frequency band, selecting, from all frequency bandwidths that can be supported by a system, a frequency bandwidth no greater than the maximum value of the available frequency band as the bandwidth of the available frequency band, and using a bandwidth in the uplink frequency band except the bandwidth of the available frequency band as the bandwidth of the guard frequency band.

With reference to any one of the third aspect, the first possible implementation manner of the third aspect, and the second possible implementation manner of the third aspect, in a third possible implementation manner, the transmission module is further configured to: schedule the UE, and transmit uplink control information and/or a reference signal in another uplink frequency band except the uplink frequency band used for downlink transmission.

With reference to any one of the third aspect, the first possible implementation manner of the third aspect, and the second possible implementation manner of the third aspect, in a fourth possible implementation manner, the transmission module is further configured to: when scheduling information of a downlink signal is transported in the uplink frequency band, send information according to a payload size (payload size) corresponding to the determined width of the available frequency band.

According to a fourth aspect, a UE for downlink transmission is provided, where the UE includes: a determining module configured to determine an uplink frequency band that includes a guard frequency band and an available frequency band and is used for downlink transmission; and a transmission module configured to receive, in the available frequency band, a downlink signal sent by a network side device, and send or receive no signal in the guard frequency band, where the guard frequency band is located in a highest-frequency part and/or a lowest-frequency part of the uplink frequency band.

With reference to the fourth aspect, in a first possible implementation manner, if the uplink frequency band used for downlink transmission is not adjacent to another uplink frequency band used for downlink transmission, the highest-frequency part and the lowest-frequency part of the uplink frequency band each has one guard frequency band; if the uplink frequency band used for downlink transmission is adjacent to another uplink frequency band used for downlink transmission, and the uplink frequency band is a highest frequency band of all adjacent uplink frequency bands, the highest-frequency part of the uplink frequency band has one guard frequency band; or if the uplink frequency band used for downlink transmission is adjacent to another uplink frequency band used for downlink transmission, and the uplink frequency band is a lowest frequency band of all adjacent uplink frequency bands, the lowest-frequency part of the uplink frequency band has one guard frequency band.

With reference to the fourth aspect or the first possible implementation manner of the fourth aspect, in a second possible implementation manner, the determining module is specifically configured to determine a bandwidth of the guard frequency band and a bandwidth of the available frequency band in the uplink frequency band according to the following manner: if the uplink frequency band has two guard frequency bands, determining, by the network side device, a bandwidth in the uplink frequency band except a bandwidth double a minimum bandwidth value of the guard frequency band, to be a maximum value of the available frequency band, selecting, from all frequency bandwidths that can be supported by a system, a frequency bandwidth no greater than the maximum value of the available frequency band as the bandwidth of the available frequency band, and using a half of a bandwidth in the uplink frequency band except the bandwidth of the available frequency band as the bandwidth of the guard frequency band; or if the uplink frequency band has one guard frequency band, determining, by the network side device, a bandwidth in the uplink frequency band except a bandwidth with a minimum bandwidth value of the guard frequency band, to be a maximum value of the available frequency band, selecting, from all frequency bandwidths that can be supported by a system, a frequency bandwidth no greater than the maximum value of the available frequency band as the bandwidth of the available frequency band, and using a bandwidth in the uplink frequency band except the bandwidth of the available frequency band as the bandwidth of the guard frequency band.

With reference to any one of the fourth aspect, the first possible implementation manner of the fourth aspect, and the second possible implementation manner of the fourth aspect, in a third possible implementation manner, the transmission module is further configured to: transmit, according to scheduling of the network side device, uplink control information and/or a reference signal in another uplink frequency band except the uplink frequency band used for downlink transmission.

With reference to any one of the fourth aspect, the first possible implementation manner of the fourth aspect, and the second possible implementation manner of the fourth aspect, in a fourth possible implementation manner, the transmission module is further configured to: when scheduling information of a downlink signal is transported in the uplink frequency band, receive information according to a payload size (payload size) corresponding to the determined width of the available frequency band.

According to a fifth aspect, a network side device for downlink transmission is provided, including: a processor configured to determine an uplink frequency band that includes a guard frequency band and an available frequency band and is used for downlink transmission; and send a downlink signal to a UE in the available frequency band by using a transceiver, and send or receive no signal in the guard frequency band; and the transceiver configured to receive and send data under control of the processor, where the guard frequency band is located in a highest-frequency part and/or a lowest-frequency part of the uplink frequency band.

With reference to the fifth aspect, in a first possible implementation manner, if the uplink frequency band used for downlink transmission is not adjacent to another uplink frequency band used for downlink transmission, the highest-frequency part and the lowest-frequency part of the uplink frequency band each has one guard frequency band; if the uplink frequency band used for downlink transmission is adjacent to another uplink frequency band used for downlink transmission, and the uplink frequency band is a highest frequency band of all adjacent uplink frequency bands, the highest-frequency part of the uplink frequency band has one guard frequency band; or if the uplink frequency band used for downlink transmission is adjacent to another uplink frequency band used for downlink transmission, and the uplink frequency band is a lowest frequency band of all adjacent uplink frequency bands, the lowest-frequency part of the uplink frequency band has one guard frequency band.

With reference to the fifth aspect or the first possible implementation manner of the fifth aspect, in a second possible implementation manner, the processor is specifically configured to determine a bandwidth of the guard frequency band and a bandwidth of the available frequency band in the uplink frequency band according to the following manner: if the uplink frequency band has two guard frequency bands, determining, by the network side device, a bandwidth in the uplink frequency band except a bandwidth double a minimum bandwidth value of the guard frequency band, to be a maximum value of the available frequency band, selecting, from all frequency bandwidths that can be supported by a system, a frequency bandwidth no greater than the maximum value of the available frequency band as the bandwidth of the available frequency band, and using a half of a bandwidth in the uplink frequency band except the bandwidth of the available frequency band as the bandwidth of the guard frequency band; or if the uplink frequency band has one guard frequency band, determining, by the network side device, a bandwidth in the uplink frequency band except a bandwidth with a minimum bandwidth value of the guard frequency band, to be a maximum value of the available frequency band, selecting, from all frequency bandwidths that can be supported by a system, a frequency bandwidth no greater than the maximum value of the available frequency band as the bandwidth of the available frequency band, and using a bandwidth in the uplink frequency band except the bandwidth of the available frequency band as the bandwidth of the guard frequency band.

With reference to any one of the fifth aspect, the first possible implementation manner of the fifth aspect, and the second possible implementation manner of the fifth aspect, in a third possible implementation manner, the processor is further configured to: schedule the UE by using the transceiver, and transmit uplink control information and/or a reference signal in another uplink frequency band except the uplink frequency band used for downlink transmission.

With reference to any one of the fifth aspect, the first possible implementation manner of the fifth aspect, and the second possible implementation manner of the fifth aspect, in a fourth possible implementation manner, the processor is further configured to: when scheduling information of a downlink signal is transported in the uplink frequency band, send, by using the transceiver, information according to a payload size (payload size) corresponding to the determined width of the available frequency band.

According to a sixth aspect, a UE for downlink transmission is provided, including: a processor configured to determine an uplink frequency band that includes a guard frequency band and an available frequency band and is used for downlink transmission; and receive, by using a transceiver, in the available frequency band, a downlink signal sent by a network side device, and send or receive no signal in the guard frequency band; and the transceiver configured to receive and send data under control of the processor, where the guard frequency band is located in a highest-frequency part and/or a lowest-frequency part of the uplink frequency band.

With reference to the sixth aspect, in a first possible implementation manner, if the uplink frequency band used for downlink transmission is not adjacent to another uplink frequency band used for downlink transmission, the highest-frequency part and the lowest-frequency part of the uplink frequency band each has one guard frequency band; if the uplink frequency band used for downlink transmission is adjacent to another uplink frequency band used for downlink transmission, and the uplink frequency band is a highest frequency band of all adjacent uplink frequency bands, the highest-frequency part of the uplink frequency band has one guard frequency band; or if the uplink frequency band used for downlink transmission is adjacent to another uplink frequency band used for downlink transmission, and the uplink frequency band is a lowest frequency band of all adjacent uplink frequency bands, the lowest-frequency part of the uplink frequency band has one guard frequency band.

With reference to the sixth aspect or the first possible implementation manner of the sixth aspect, in a second possible implementation manner, the processor is specifically configured to determine a bandwidth of the guard frequency band and a bandwidth of the available frequency band in the uplink frequency band according to the following manner: if the uplink frequency band has two guard frequency bands, determining, by the network side device, a bandwidth in the uplink frequency band except a bandwidth double a minimum bandwidth value of the guard frequency band, to be a maximum value of the available frequency band, selecting, from all frequency bandwidths that can be supported by a system, a frequency bandwidth no greater than the maximum value of the available frequency band as the bandwidth of the available frequency band, and using a half of a bandwidth in the uplink frequency band except the bandwidth of the available frequency band as the bandwidth of the guard frequency band; or if the uplink frequency band has one guard frequency band, determining, by the network side device, a bandwidth in the uplink frequency band except a bandwidth with a minimum bandwidth value of the guard frequency band, to be a maximum value of the available frequency band, selecting, from all frequency bandwidths that can be supported by a system, a frequency bandwidth no greater than the maximum value of the available frequency band as the bandwidth of the available frequency band, and using a bandwidth in the uplink frequency band except the bandwidth of the available frequency band as the bandwidth of the guard frequency band.

With reference to any one of the sixth aspect, the first possible implementation manner of the sixth aspect, and the second possible implementation manner of the sixth aspect, in a third possible implementation manner, the processor is further configured to: transmit, according to scheduling of the network side device, uplink control information and/or a reference signal in another uplink frequency band except the uplink frequency band used for downlink transmission.

With reference to any one of the sixth aspect, the first possible implementation manner of the sixth aspect, and the second possible implementation manner of the sixth aspect, in a fourth possible implementation manner, the processor is further configured to: when scheduling information of a downlink signal is transported in the uplink frequency band, receive, by using the transceiver, information according to a payload size (payload size) corresponding to the determined width of the available frequency band.

In the embodiments of this application, a downlink signal is sent to a UE in an available frequency band of an uplink frequency band, and no signal is sent or received in a guard frequency band of the uplink frequency band, where the guard frequency band is located in a highest-frequency part and/or a lowest-frequency part of the uplink frequency band. Because no signal is sent or received in the guard frequency band of the uplink frequency band, interference to communication of a UE in an adjacent frequency band is reduced when the uplink frequency band is occupied for downlink transmission, thereby improving system performance.

DESCRIPTION OF EMBODIMENTS

In the embodiments of this application, a downlink signal is sent to a UE in an available frequency band of an uplink frequency band, and no signal is sent or received in a guard frequency band of the uplink frequency band, where the guard frequency band is located in a highest-frequency part and/or a lowest-frequency part of the uplink frequency band. Because no signal is sent or received in the guard frequency band of the uplink frequency band, interference to communication of a UE in an adjacent frequency band is reduced when the uplink frequency band is occupied for downlink transmission, thereby improving system performance.

The embodiments of this application are further described in detail below with reference to the accompanying drawings of this specification.

As shown in FIG. 1, a system for downlink transmission according to Embodiment 1 of this application includes: a network side device 10 configured to determine an uplink frequency band that includes a guard frequency band and an available frequency band and is used for downlink transmission; and send a downlink signal to a UE in the available frequency band, and send or receive no signal in the guard frequency band; and the UE 11 configured to determine an uplink frequency band that includes a guard frequency band and an available frequency band and is used for downlink transmission; and receive, in the available frequency band, the downlink signal sent by the network side device, and send or receive no signal in the guard frequency band, where the guard frequency band is located in a highest-frequency part and/or a lowest-frequency part of the uplink frequency band.

In this embodiment of this application, when the downlink signal is transmitted in the uplink frequency band, a guard frequency band with sufficient frequency bands is reserved, so that the downlink signal sent by the network side device attenuates below an interference tolerance threshold of an adjacent frequency band in the guard band, so as to reduce interference to communication of a UE in the adjacent frequency band when the uplink frequency band is occupied for downlink transmission, thereby improving system performance.

In this embodiment of this application, when the frequency band is used for uplink transmission, the whole frequency band may be used for signal transmission; but when the frequency band is used for downlink transmission, only an available frequency band may be used to transmit a signal, and an edge frequency band is reserved as a guard frequency band that does not transmit a signal, including all signals like a data signal, a reference signal, and a control signal. Available resources of the frequency band are different when corresponding to different signal transmission directions, and for details, reference may be made to FIG. 2.

Each uplink frequency band may include a guard frequency band and an available frequency band. Preferably, bandwidths of the guard frequency band and the available frequency band may be determined according to a traffic volume requirement by the network side device and then are notified to the UE, or may also be specified in advance in a protocol.

During implementation, in this embodiment of this application, an uplink frequency band used for downlink transmission may have one guard frequency band, may have two guard intervals, or may have no guard interval, which are introduced separately in the following.

Case 1: an uplink frequency band used for downlink transmission has two guard intervals.

In this case, because the uplink frequency band used for downlink transmission is not adjacent to another uplink frequency band used for downlink transmission, the uplink frequency band used for downlink transmission has two guard intervals, and a highest-frequency part and a lowest-frequency part of the uplink frequency band each has one guard frequency band.

During implementation, bandwidths of two guard intervals may be the same or may be different, but cannot be less than a preset minimum bandwidth value of the guard frequency band.

That bandwidths of two guard intervals are the same is used as an example:

If the uplink frequency band has two guard frequency bands, the network side device determines a bandwidth in the uplink frequency band except a bandwidth double a minimum bandwidth value of the guard frequency band, to be a maximum value of an available frequency band, selects, from all frequency bandwidths that can be supported by a system, a frequency bandwidth no greater than the maximum value of the available frequency band as a bandwidth of the available frequency band, and uses a half of a bandwidth in the uplink frequency band except the bandwidth of the available frequency band as the bandwidth of the guard frequency band.

For example, if a bandwidth of the uplink frequency band is A, and a minimum bandwidth value of the guard frequency band is B, a maximum value of the available frequency band is A−2B, and if a frequency bandwidth that is not greater than A−2B and is selected from all frequency bandwidths that can be supported by a system is D, the bandwidth of the guard frequency band is (A−D)/2.

The minimum bandwidth value of the guard frequency band is related to a transmit power of the network side device and an attenuation condition of a signal in the guard frequency band. During implementation, it needs to be ensured that a signal of the network side device attenuates, in the guard interval, within an allowable range (for example, below an interference tolerance threshold of the adjacent frequency band).

Figure 2:
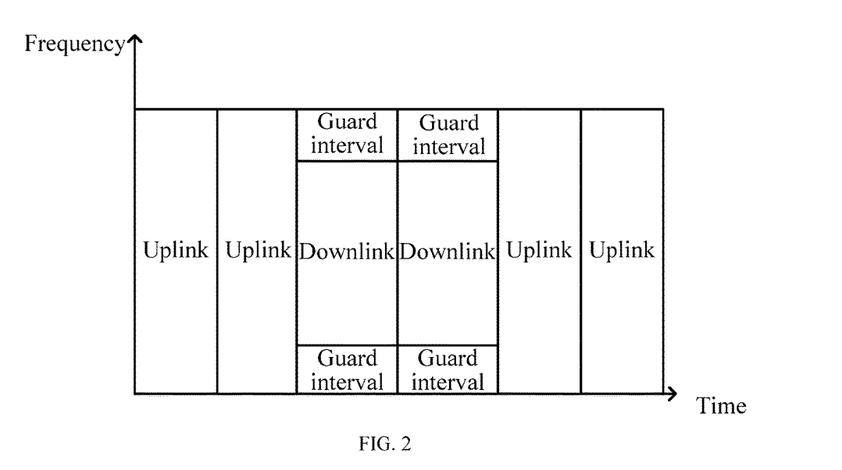
FIG. 2 is a schematic diagram in which available resources are corresponding to different transmission directions according to Embodiment 2 of this application.
Figure 3:
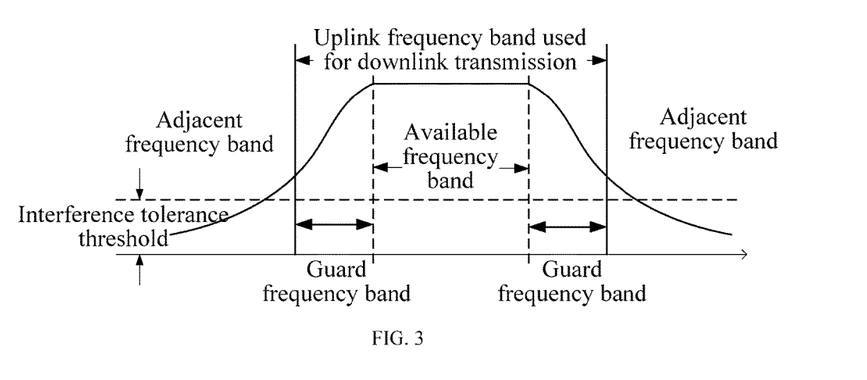
FIG. 3 is a schematic diagram of one uplink frequency band according to Embodiment 3 of this application.

As shown in FIG. 2, assuming that a transmit power of the network side device is P, and an interference tolerance threshold of the adjacent frequency band is P_MIN, a downlink signal transmitted by the network side device requires an attenuation of (P-P_MIN) on power in the guard frequency band.

Because the signal is leaked in the adjacent frequency band, and a part of the power of the signal in an available frequency band is leaked to the adjacent frequency band, a guard frequency band is reserved, so that interference leaked to the adjacent frequency band is reduced, and communication in the adjacent frequency band is not affected. Therefore, although no signal is sent in the guard frequency band, the signal also smoothly attenuates in the guard frequency band because the signal is leaked in the adjacent frequency band.

Assuming that a width of an uplink frequency band is A, and a center frequency is f0, minimum values of bandwidths of the guard frequency bands required by both sides of the bandwidth are B. That is, a range of the uplink frequency band is [f0−A/2, f0+A/2].

After determining that the downlink signal needs to be received in the uplink frequency band, the UE and the network side device determine a center frequency of the system and calculate a frequency bandwidth of a downlink signal to be received, of which a specific procedure is as follows:

The UE and the network side device determine that a center frequency of a downlink frequency band for transmitting a signal in the system is the same as that of the uplink frequency band.

To prevent interference to a signal in the adjacent frequency band, the UE and the network side device determine that, after the guard frequency band is removed from the uplink frequency band, a maximum frequency bandwidth that may be used for transmitting a downlink signal is: C=(A−2*B).

All communications system devices can support communication at multiple frequency bandwidths, for example, a current LTE system supports 6 different frequency bandwidths: 1.4 MHz, 3 MHz, 5 MHz, 10 MHz, 15 MHz and 20 MHz.

A bandwidth less than C is selected as a bandwidth for downlink transmission. Preferably, a maximum bandwidth less than C is selected as a bandwidth for downlink transmission.

If A=20 MHz, B=4 MHz, and the UE and the network side device determine that the bandwidth C=12 MHz, the UE and the network side device select a downlink bandwidth of 10 MHz, that is, use a frequency band with a center frequency of f0 and a width of 10 MHz as an available frequency band, so that the bandwidth of the guard frequency band actually reserved on two sides of the frequency band is B'=5 MHz.

That is, when the frequency band is used for uplink transmission, the UE sends an uplink signal according to the bandwidth of 20 MHz, and the network side device receives the signal at the corresponding bandwidth of 20 MHz; and when the frequency band is used for downlink transmission, the network side device sends a downlink signal according to the bandwidth of 10 MHz, and the UE receives the signal at the corresponding bandwidth of 10 MHz. That is, a downlink range of the available frequency band is [f0−A/2+B'/2, f0+A/2−B'/2].

Case 2: an uplink frequency band used for downlink transmission has one guard interval.

In this case, because the uplink frequency band used for downlink transmission is adjacent to another uplink frequency band used for downlink transmission, the uplink frequency band used for downlink transmission has one guard interval.

Specifically, if the uplink frequency band used for downlink transmission is adjacent to another uplink frequency band used for downlink transmission, and the uplink frequency band is a highest frequency band of all adjacent uplink frequency bands, the highest-frequency part of the uplink frequency band has one guard frequency band; or if the uplink frequency band used for downlink transmission is adjacent to another uplink frequency band used for downlink transmission, and the uplink frequency band is a lowest frequency band of all adjacent uplink frequency bands, the lowest-frequency part of the uplink frequency band has one guard frequency band.

During implementation, guard intervals of each uplink frequency band including the guard intervals may be totally the same, may be totally different, or may be partially the same, but cannot be less than a preset minimum bandwidth value of the guard frequency band.

For case 2, there are multiple cases for that the uplink frequency band used for downlink transmission is adjacent to another uplink frequency band used for downlink transmission.

During implementation, if the uplink frequency band has one guard frequency band, the network side device determines a bandwidth in the uplink frequency band except a bandwidth with a minimum bandwidth value of the guard frequency band, to be a maximum value of an available frequency band, selects, from all frequency bandwidths that can be supported by a system, a frequency bandwidth no greater than the maximum value of the available frequency band as a bandwidth of the available frequency band, and uses a bandwidth in the uplink frequency band except the bandwidth of the available frequency band as the bandwidth of the guard frequency band.

For example, if a bandwidth of the uplink frequency band is A, and a minimum bandwidth value of the guard frequency band is B, a maximum value of the available frequency band is A−B, and if a frequency bandwidth that is not greater than A−B and is selected from all frequency bandwidths that can be supported by a system is D, the bandwidth of the guard frequency band is (A−D)/2.

The minimum bandwidth value of the guard frequency band is related to a transmit power of the network side device and an attenuation condition of a signal in the guard frequency band. During implementation, it needs to be ensured that a signal of the network side device attenuates, in the guard interval, within an allowable range (for example, below an interference tolerance threshold of the adjacent frequency band).

Figure 4:
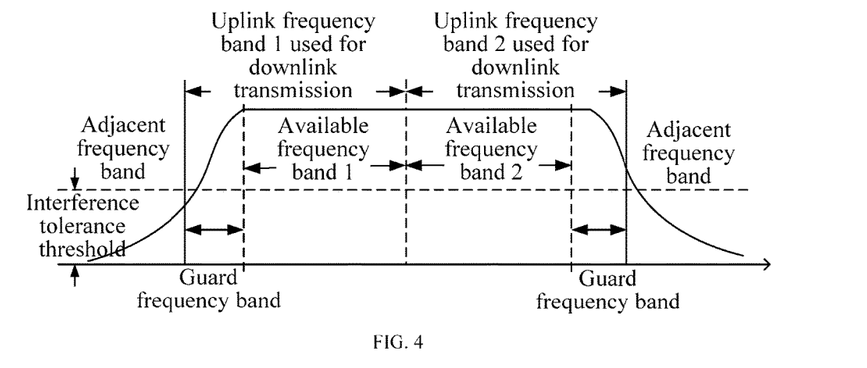
FIG. 4 is a schematic diagram of two uplink frequency bands according to Embodiment 4 of this application.

For example, in FIG. 4, if two frequency bands used for downlink transmission are adjacent frequency bands, only a guard frequency band needs to be reserved in a highest-frequency part of a high frequency band and a lowest-frequency part of a low frequency band.

Figure 5:
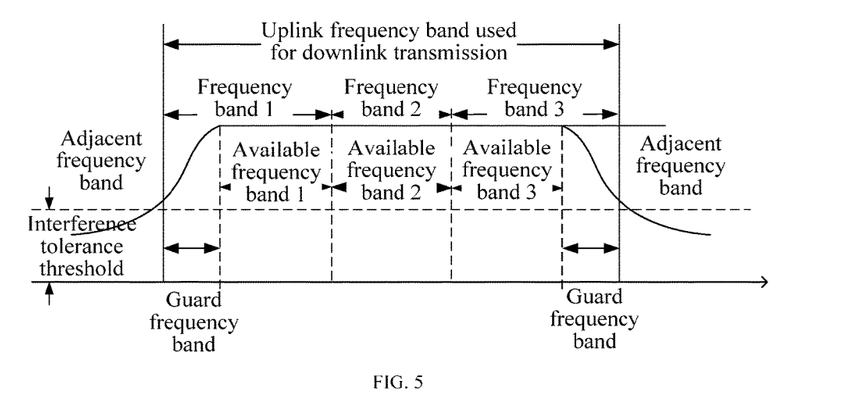
FIG. 5 is a schematic diagram of three uplink frequency bands according to Embodiment 5 of this application.

Further, for example, in FIG. 5, if the uplink frequency band used for downlink transmission is greater than or equal to three adjacent frequency bands, only a guard frequency band needs to be reserved in a highest-frequency part of a high frequency band and a lowest-frequency part of a low frequency band, and an intermediate frequency band may be fully used as a frequency band and used for transmitting a downlink signal.

The following separately performs description with reference to FIG. 4 and FIG. 5.

As shown in FIG. 4, assuming that a transmit power of the network side device is P, and an interference tolerance threshold of the adjacent frequency band is P_MIN, a downlink signal transmitted by the network side device needs an attenuation of (P-P_MIN) on power in the guard frequency band.

It is assumed that a width of an uplink frequency band 1 is A1, and a center frequency is f1. If a width of an uplink frequency band 2 is A2, and a center frequency is f2, minimum widths of guard frequency bands required by both sides of the bandwidth are B. That is, a range of the uplink frequency band 1 is [f1−A1/2, f1+A1/2], and a range of the uplink frequency band 2 is [f2−A2/2, f2+A2/2].

After determining that the downlink signal needs to be received in the uplink frequency band, the UE and the network side device determine a center frequency of the system and calculate a frequency bandwidth of a downlink signal to be received, and a specific procedure is that:

1. Determine an Available Frequency Band 1.

To prevent interference to a signal in the adjacent frequency band, the UE and the network side device determine that, after the guard frequency band is removed from the uplink frequency band, a maximum frequency bandwidth that may be used for transmitting a downlink signal is: C1=(A1−B).

All communications system devices can support communication at multiple frequency bandwidths, for example, a current LTE system supports 6 different frequency bandwidths: 1.4 MHz, 3 MHz, 5 MHz, 10 MHz, 15 MHz, and 20 MHz.

A bandwidth less than C1 is selected as a bandwidth for downlink transmission. Preferably, a maximum bandwidth less than C1 is selected as a bandwidth for downlink transmission.

If A1=20 MHz, B=4 MHz, and the UE and the network side device determine that the bandwidth C1=16 MHz, a downlink bandwidth of 15 MHz is selected, that is, a signal with a center frequency of f1' and a bandwidth of 15 MHz is received, so that a guard bandwidth actually reserved in a low frequency band is B1'=5 MHz.

That is, when the frequency band is used for uplink transmission, the UE sends an uplink signal according to the bandwidth of 20 MHz, and the network side device receives the signal at the corresponding bandwidth of 20 MHz; and when the frequency band is used for downlink transmission, the network side device sends a downlink signal according to the bandwidth of 15 MHz, and the UE receives the signal at the corresponding bandwidth of 15 MHz. A center frequency of a downlink frequency band for transmitting a signal in a system is f1'=(f1+B1'/2). That is, a downlink range of the available frequency band 1 is [f1 −A1/2+B1', f1+A1/2].

2. Determine an Available Frequency Band 2.

To prevent interference to a signal in the adjacent frequency band, the UE and the network side device determine that, after the guard frequency band is removed from the uplink frequency band, a maximum frequency bandwidth that may be used for transmitting a downlink signal is: C2=(A2−B).

All communications system devices can support communication at multiple frequency bandwidths, for example, a current LTE system supports 6 different frequency bandwidths: 1.4 MHz, 3 MHz, 5 MHz, 10 MHz, 15 MHz, and 20 MHz.

A bandwidth less than C2 is selected as a bandwidth for downlink transmission. Preferably, a maximum bandwidth less than C2 is selected as a bandwidth for downlink transmission.

If A2=10 MHz, B=4 MHz, and the UE and the network side device determine that the bandwidth C2=6 MHz, a downlink bandwidth of 5 MHz is selected, that is, a signal with a center frequency of f2' and a width of 5 MHz is received, so that a guard bandwidth actually reserved in a high frequency band is B2'=5 MHz.

That is, when the frequency band is used for uplink transmission, the UE sends an uplink signal according to the bandwidth of 10 MHz, and the network side device receives the signal at the corresponding bandwidth of 10 MHz; and when the frequency band is used for downlink transmission, the network side device sends a downlink signal according to the bandwidth of 5 MHz, and the UE receives the signal at the corresponding bandwidth of 5 MHz. A center frequency of a downlink frequency band for transmitting a signal in a system is f2'=(f2−B2'/2). That is, a downlink range of the available frequency band 2 is [f2−A2/2, f2+A2/2−B2'].

As shown in FIG. 5, center frequencies and widths of available frequency bands of an uplink frequency band 1 and an uplink frequency band 3 in the figure may be obtained according to the method for the uplink frequency band 1 and the uplink frequency band 2 in FIG. 4, which is not described herein again. The center frequency and the width of an uplink frequency band 2 in FIG. 5 for transmitting a downlink signal are the same as those for performing uplink transmission, and remain unchanged.

For the foregoing case 1 and case 2, the network side device sends a reference signal, a data signal or the like according to the selected available frequency band and center frequency, and the UE receives the data signal according to the available frequency band, and performs channel measurement and channel quality reporting.

Because the width of the available frequency band is less than that of the uplink frequency band, when the network side device sends downlink scheduling information to the UE, a payload size (payload size) of the scheduling information may be reduced correspondingly. Likewise, the UE demodulates the scheduling information according to the downlink bandwidth and according to the corresponding payload size.

Specifically, when scheduling information of a downlink signal is transported in the uplink frequency band, information is sent according to a payload size corresponding to the determined width of the available frequency band.

Correspondingly, when scheduling information of a downlink signal is transported in the uplink frequency band, information is received according to a payload size corresponding to the determined width of the available frequency band.

During implementation, because some signals are reported periodically, and when the network side device selects the available frequency band as downlink, it cannot be ensured that resources of these signals reported periodically are still uplink, reported resources of the UE need to be adjusted.

Specifically, the network side device schedules the UE, and transmits uplink control information and/or a reference signal in another uplink frequency band except the uplink frequency band used for downlink transmission.

Correspondingly, the UE transmits, according to scheduling of the network side device, uplink control information and/or a reference signal in another uplink frequency band except the uplink frequency band used for downlink transmission.

Case 3: an uplink frequency band used for downlink transmission has no guard interval.

In this case, because the uplink frequency band used for downlink transmission is adjacent to other two uplink frequency bands used for downlink transmission, the uplink frequency band used for downlink transmission has no guard interval. For this case, reference may be made to the uplink frequency band 2 in FIG. 5.

For this uplink frequency band, the whole bandwidth is an available frequency band, and the center frequency is the same as that when uplink transmission is performed.

Figure 6:
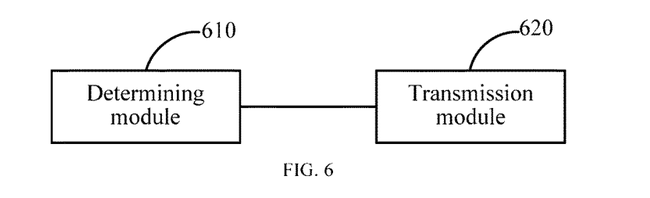
FIG. 6 is a schematic diagram of a network side device in a system for downlink transmission according to Embodiment 6 of this application.

As shown in FIG. 6, a network side device in a system for downlink transmission in Embodiment 6 of this application includes: a determining module 610 and a transmission module 620.

The determining module 610 is configured to determine an uplink frequency band that includes a guard frequency band and an available frequency band and is used for downlink transmission.

The transmission module 620 is configured to send a downlink signal to a UE in the available frequency band, and send or receive no signal in the guard frequency band.

The guard frequency band is located in a highest-frequency part and/or a lowest-frequency part of the uplink frequency band.

Preferably, if the uplink frequency band used for downlink transmission is not adjacent to another uplink frequency band used for downlink transmission, the highest-frequency part and the lowest-frequency part of the uplink frequency band each has one guard frequency band; if the uplink frequency band used for downlink transmission is adjacent to another uplink frequency band used for downlink transmission, and the uplink frequency band is a highest frequency band of all adjacent uplink frequency bands, the highest-frequency part of the uplink frequency band has one guard frequency band; or if the uplink frequency band used for downlink transmission is adjacent to another uplink frequency band used for downlink transmission, and the uplink frequency band is a lowest frequency band of all adjacent uplink frequency bands, the lowest-frequency part of the uplink frequency band has one guard frequency band.

Preferably, the determining module 610 is further configured to determine a bandwidth of the guard frequency band and a bandwidth of the available frequency band in the uplink frequency band according to the following manner: if the uplink frequency band has two guard frequency bands, determining, by the network side device, a bandwidth in the uplink frequency band except a bandwidth double a minimum bandwidth value of the guard frequency band, to be a maximum value of the available frequency band, selecting, from all frequency bandwidths that can be supported by a system, a frequency bandwidth no greater than the maximum value of the available frequency band as the bandwidth of the available frequency band, and using a half of a bandwidth in the uplink frequency band except the bandwidth of the available frequency band as the bandwidth of the guard frequency band; or if the uplink frequency band has one guard frequency band, determining, by the network side device, a bandwidth in the uplink frequency band except a bandwidth with a minimum bandwidth value of the guard frequency band, to be a maximum value of the available frequency band, selecting, from all frequency bandwidths that can be supported by a system, a frequency bandwidth no greater than the maximum value of the available frequency band as the bandwidth of the available frequency band, and using a bandwidth in the uplink frequency band except the bandwidth of the available frequency band as the bandwidth of the guard frequency band.

Preferably, the transmission module 620 is further configured to: schedule the UE, and transmit uplink control information and/or a reference signal in another uplink frequency band except the uplink frequency band used for downlink transmission.

Preferably, the transmission module 620 is further configured to: when scheduling information of a downlink signal is transported in the uplink frequency band, send information according to a payload size corresponding to the determined width of the available frequency band.

Figure 7:
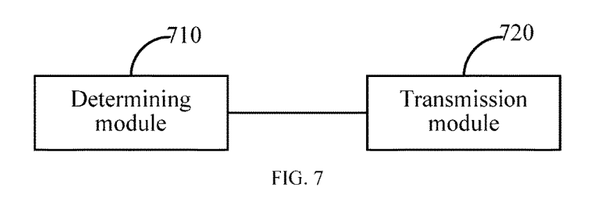
FIG. 7 is a schematic diagram of a UE in a system for downlink transmission according to Embodiment 7 of this application.

As shown in FIG. 7, a UE in a system for downlink transmission in Embodiment 7 of this application includes: a determining module 710 and a transmission module 720.

The determining module 710 is configured to determine an uplink frequency band that includes a guard frequency band and an available frequency band and is used for downlink transmission.

The transmission module 720 is configured to receive, in the available frequency band, a downlink signal sent by a network side device, and send or receive no signal in the guard frequency band.

The guard frequency band is located in a highest-frequency part and/or a lowest-frequency part of the uplink frequency band.

Preferably, if the uplink frequency band used for downlink transmission is not adjacent to another uplink frequency band used for downlink transmission, the highest-frequency part and the lowest-frequency part of the uplink frequency band each has one guard frequency band; if the uplink frequency band used for downlink transmission is adjacent to another uplink frequency band used for downlink transmission, and the uplink frequency band is a highest frequency band of all adjacent uplink frequency bands, the highest-frequency part of the uplink frequency band has one guard frequency band; or if the uplink frequency band used for downlink transmission is adjacent to another uplink frequency band used for downlink transmission, and the uplink frequency band is a lowest frequency band of all adjacent uplink frequency bands, the lowest-frequency part of the uplink frequency band has one guard frequency band.

Preferably, the determining module 710 is further configured to determine a bandwidth of the guard frequency band and a bandwidth of the available frequency band in the uplink frequency band according to the following manner: if the uplink frequency band has two guard frequency bands, determining, by the network side device, a bandwidth in the uplink frequency band except a bandwidth double a minimum bandwidth value of the guard frequency band, to be a maximum value of the available frequency band, selecting, from all frequency bandwidths that can be supported by a system, a frequency bandwidth no greater than the maximum value of the available frequency band as the bandwidth of the available frequency band, and using a half of a bandwidth in the uplink frequency band except the bandwidth of the available frequency band as the bandwidth of the guard frequency band; or if the uplink frequency band has one guard frequency band, determining, by the network side device, a bandwidth in the uplink frequency band except a bandwidth with a minimum bandwidth value of the guard frequency band, to be a maximum value of the available frequency band, selecting, from all frequency bandwidths that can be supported by a system, a frequency bandwidth no greater than the maximum value of the available frequency band as the bandwidth of the available frequency band, and using a bandwidth in the uplink frequency band except the bandwidth of the available frequency band as the bandwidth of the guard frequency band.

Preferably, the transmission module 720 is further configured to: transmit, according to scheduling of the network side device, uplink control information and/or a reference signal in another uplink frequency band except the uplink frequency band used for downlink transmission.

Preferably, the transmission module 720 is further configured to: when scheduling information of a downlink signal is transported in the uplink frequency band, receive information according to a payload size corresponding to the determined width of the available frequency band.

Figure 8:
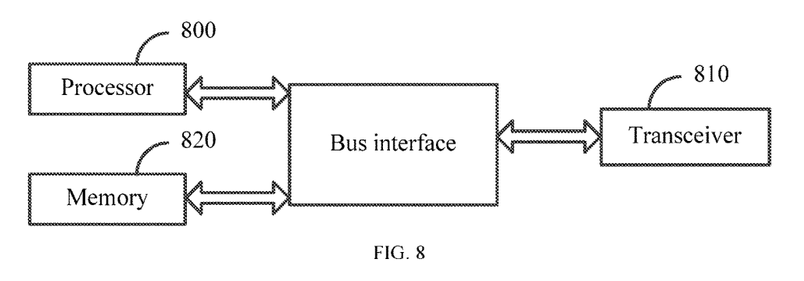
FIG. 8 is a schematic diagram of a network side device in a system for downlink transmission according to Embodiment 8 of this application.

As shown in FIG. 8, a network side device in a system for downlink transmission according to Embodiment 8 of this application includes: a processor 800 configured to determine an uplink frequency band that includes a guard frequency band and an available frequency band and is used for downlink transmission; and send a downlink signal to a UE in the available frequency band by using a transceiver 810, and send or receive no signal in the guard frequency band; and the transceiver 810 configured to receive and send data under control of the processor 800, where the guard frequency band is located in a highest-frequency part and/or a lowest-frequency part of the uplink frequency band.

Preferably, if the uplink frequency band used for downlink transmission is not adjacent to another uplink frequency band used for downlink transmission, the highest-frequency part and the lowest-frequency part of the uplink frequency band each has one guard frequency band; if the uplink frequency band used for downlink transmission is adjacent to another uplink frequency band used for downlink transmission, and the uplink frequency band is a highest frequency band of all adjacent uplink frequency bands, the highest-frequency part of the uplink frequency band has one guard frequency band; or if the uplink frequency band used for downlink transmission is adjacent to another uplink frequency band used for downlink transmission, and the uplink frequency band is a lowest frequency band of all adjacent uplink frequency bands, the lowest-frequency part of the uplink frequency band has one guard frequency band.

Preferably, the processor 800 is further configured to determine a bandwidth of the guard frequency band and a bandwidth of the available frequency band in the uplink frequency band according to the following manner: if the uplink frequency band has two guard frequency bands, determining, by the network side device, a bandwidth in the uplink frequency band except a bandwidth double a minimum bandwidth value of the guard frequency band, to be a maximum value of the available frequency band, selecting, from all frequency bandwidths that can be supported by a system, a frequency bandwidth no greater than the maximum value of the available frequency band as the bandwidth of the available frequency band, and using a half of a bandwidth in the uplink frequency band except the bandwidth of the available frequency band as the bandwidth of the guard frequency band; or if the uplink frequency band has one guard frequency band, determining, by the network side device, a bandwidth in the uplink frequency band except a bandwidth with a minimum bandwidth value of the guard frequency band, to be a maximum value of the available frequency band, selecting, from all frequency bandwidths that can be supported by a system, a frequency bandwidth no greater than the maximum value of the available frequency band as the bandwidth of the available frequency band, and using a bandwidth in the uplink frequency band except the bandwidth of the available frequency band as the bandwidth of the guard frequency band.

Preferably, the processor 800 is further configured to: schedule the UE by using the transceiver 810, and transmit uplink control information and/or a reference signal in another uplink frequency band except the uplink frequency band used for downlink transmission.

Preferably, the processor 800 is further configured to: when scheduling information of a downlink signal is transported in the uplink frequency band, send, by using the transceiver, information according to a payload size corresponding to the determined width of the available frequency band.

In FIG. 8, a bus architecture may include any number of interconnected buses and bridges, which are specifically linked together by various circuits of one or more processors represented by the processor 800 and a memory represented by a memory 820. The bus architecture may further link together various other circuits such as a peripheral device, a voltage regulator and a power management circuit, which are well known in the art, and therefore are not further described in this specification. A bus interface provides an interface. The transceiver 810 may be multiple components, that is, including a transmitter and a receiver, and provides a unit configured to communicate with various other apparatuses on a transmission medium. The processor 800 is responsible for managing the bus architecture and common processing, and the memory 820 can store data used when the processor 800 performs an operation.

The processor 800 is responsible for managing the bus architecture and common processing, and the memory 820 can store data used when the processor 800 performs an operation.

Figure 9:
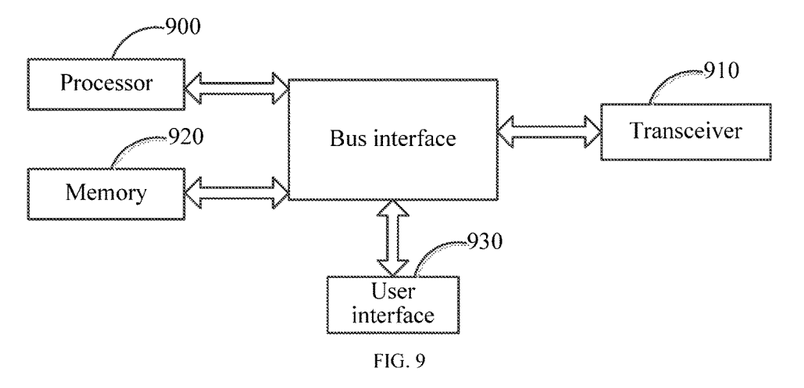
FIG. 9 is a schematic diagram of a UE in a system for downlink transmission according to Embodiment 9 of this application.

As shown in FIG. 9, a UE in a system for downlink transmission according to Embodiment 9 of this application includes: a processor 900 configured to determine an uplink frequency band that includes a guard frequency band and an available frequency band and is used for downlink transmission; and receive, by using a transceiver 910, in the available frequency band, a downlink signal sent by a network side device, and send or receive no signal in the guard frequency band; and the transceiver 910 configured to receive and send data under control of the processor 900, where the guard frequency band is located in a highest-frequency part and/or a lowest-frequency part of the uplink frequency band.

Preferably, if the uplink frequency band used for downlink transmission is not adjacent to another uplink frequency band used for downlink transmission, the highest-frequency part and the lowest-frequency part of the uplink frequency band each has one guard frequency band; if the uplink frequency band used for downlink transmission is adjacent to another uplink frequency band used for downlink transmission, and the uplink frequency band is a highest frequency band of all adjacent uplink frequency bands, the highest-frequency part of the uplink frequency band has one guard frequency band; or if the uplink frequency band used for downlink transmission is adjacent to another uplink frequency band used for downlink transmission, and the uplink frequency band is a lowest frequency band of all adjacent uplink frequency bands, the lowest-frequency part of the uplink frequency band has one guard frequency band.

Preferably, the processor 900 is further configured to determine a bandwidth of the guard frequency band and a bandwidth of the available frequency band in the uplink frequency band according to the following manner: if the uplink frequency band has two guard frequency bands, determining, by the network side device, a bandwidth in the uplink frequency band except a bandwidth double a minimum bandwidth value of the guard frequency band, to be a maximum value of the available frequency band, selecting, from all frequency bandwidths that can be supported by a system, a frequency bandwidth no greater than the maximum value of the available frequency band as the bandwidth of the available frequency band, and using a half of a bandwidth in the uplink frequency band except the bandwidth of the available frequency band as the bandwidth of the guard frequency band; or if the uplink frequency band has one guard frequency band, determining, by the network side device, a bandwidth in the uplink frequency band except a bandwidth with a minimum bandwidth value of the guard frequency band, to be a maximum value of the available frequency band, selecting, from all frequency bandwidths that can be supported by a system, a frequency bandwidth no greater than the maximum value of the available frequency band as the bandwidth of the available frequency band, and using a bandwidth in the uplink frequency band except the bandwidth of the available frequency band as the bandwidth of the guard frequency band.

Preferably, the processor 900 is further configured to: transmit, according to scheduling of the network side device, uplink control information and/or a reference signal in another uplink frequency band except the uplink frequency band used for downlink transmission.

Preferably, the processor 900 is further configured to: when scheduling information of a downlink signal is transported in the uplink frequency band, receive, by using the transceiver, information according to a payload size corresponding to the determined width of the available frequency band.

In FIG. 9, a bus architecture may include any quantity of interconnected buses and bridges, which are specifically linked together by various circuits of one or more processors represented by the processor 900 and a memory represented by a memory 920. The bus architecture may further link together various other circuits such as a peripheral device, a voltage regulator and a power management circuit, which are well known in the art, and therefore are not further described in this specification. A bus interface provides an interface. The transceiver 910 may be multiple components, that is, including a transmitter and a receiver, and provides a unit configured to communicate with various other apparatuses on a transmission medium. For different UEs, a user interface 930 may also be an interface that can be externally connected and internally connected to a required device, and the connected device includes, but is not limited to, a keypad, a display, a loudspeaker, a microphone, or a joystick.

The processor 900 is responsible for managing the bus architecture and common processing, and the memory 920 can store data used when the processor 900 performs an operation.

Based on the same idea, the embodiments of this application further separately provide methods for downlink transmission. Because devices corresponding to these methods are devices in the system for downlink transmission in this embodiment of this application, and principles of the methods for solving a problem are similar to that of the system, for implementation of the methods, reference may be made to the implementation of the corresponding devices in the system, and repeated parts are not described again.

Figure 10:
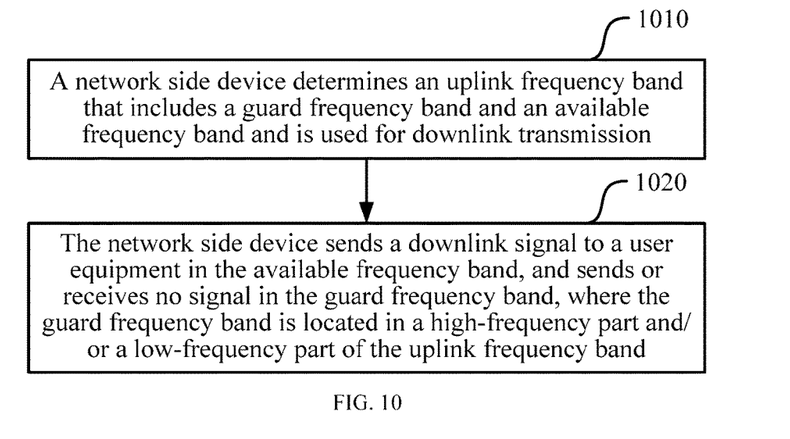
FIG. 10 is a schematic flowchart of a method for downlink transmission according to Embodiment 10 of this application.

As shown in FIG. 10, a method for downlink transmission according to Embodiment 10 of this application includes:

Step 1010: A network side device determines an uplink frequency band that includes a guard frequency band and an available frequency band and is used for downlink transmission.

Step 1020: The network side device sends a downlink signal to a UE in the available frequency band, and sends or receives no signal in the guard frequency band.

The guard frequency band is located in a highest-frequency part and/or a lowest-frequency part of the uplink frequency band.

Preferably, if the uplink frequency band used for downlink transmission is not adjacent to another uplink frequency band used for downlink transmission, the highest-frequency part and the lowest-frequency part of the uplink frequency band each has one guard frequency band; if the uplink frequency band used for downlink transmission is adjacent to another uplink frequency band used for downlink transmission, and the uplink frequency band is a highest frequency band of all adjacent uplink frequency bands, the highest-frequency part of the uplink frequency band has one guard frequency band; or if the uplink frequency band used for downlink transmission is adjacent to another uplink frequency band used for downlink transmission, and the uplink frequency band is a lowest frequency band of all adjacent uplink frequency bands, the lowest-frequency part of the uplink frequency band has one guard frequency band.

Preferably, the network side device determines a bandwidth of the guard frequency band and a bandwidth of the available frequency band in the uplink frequency band according to the following manner: if the uplink frequency band has two guard frequency bands, determining, by the network side device, a bandwidth in the uplink frequency band except a bandwidth double a minimum bandwidth value of the guard frequency band, to be a maximum value of the available frequency band, selecting, from all frequency bandwidths that can be supported by a system, a frequency bandwidth no greater than the maximum value of the available frequency band as the bandwidth of the available frequency band, and using a half of a bandwidth in the uplink frequency band except the bandwidth of the available frequency band as the bandwidth of the guard frequency band; or if the uplink frequency band has one guard frequency band, determining, by the network side device, a bandwidth in the uplink frequency band except a bandwidth with a minimum bandwidth value of the guard frequency band, to be a maximum value of the available frequency band, selecting, from all frequency bandwidths that can be supported by a system, a frequency bandwidth no greater than the maximum value of the available frequency band as the bandwidth of the available frequency band, and using a bandwidth in the uplink frequency band except the bandwidth of the available frequency band as the bandwidth of the guard frequency band.

Preferably, after the determining, by a network side device, an uplink frequency band that includes a guard frequency band and an available frequency band and is used for downlink transmission, the method further includes: scheduling, by the network side device, the UE, and transmitting uplink control information and/or a reference signal in another uplink frequency band except the uplink frequency band used for downlink transmission.

Preferably, after the determining, by a network side device, an uplink frequency band that includes a guard frequency band and an available frequency band and is used for downlink transmission, the method further includes: when scheduling information of a downlink signal is transported in the uplink frequency band, sending, by the network side device, information according to a payload size corresponding to the determined width of the available frequency band.

Figure 11:
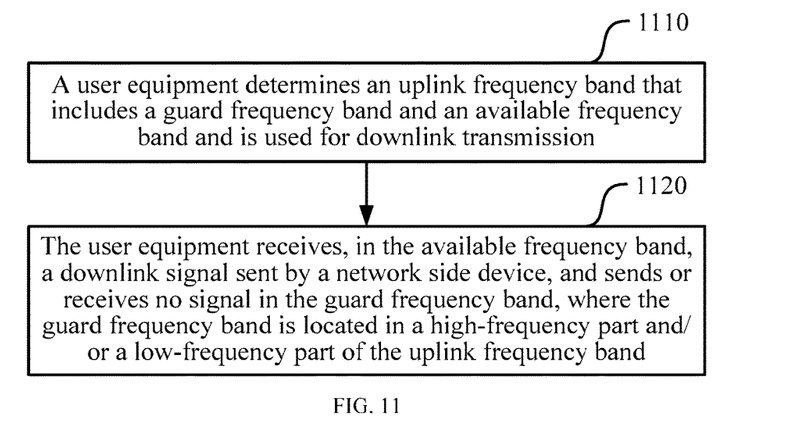
FIG. 11 is a schematic flowchart of a method for downlink transmission according to Embodiment 11 of this application.

As shown in FIG. 11, a method for downlink transmission according to Embodiment 11 of this application includes:

Step 1110: A UE determines an uplink frequency band that includes a guard frequency band and an available frequency band and is used for downlink transmission.

Step 1120: The UE receives, in the available frequency band, a downlink signal sent by a network side device, and sends or receives no signal in the guard frequency band.

The guard frequency band is located in a highest-frequency part and/or a lowest-frequency part of the uplink frequency band.

Preferably, if the uplink frequency band used for downlink transmission is not adjacent to another uplink frequency band used for downlink transmission, the highest-frequency part and the lowest-frequency part of the uplink frequency band each has one guard frequency band; if the uplink frequency band used for downlink transmission is adjacent to another uplink frequency band used for downlink transmission, and the uplink frequency band is a highest frequency band of all adjacent uplink frequency bands, the highest-frequency part of the uplink frequency band has one guard frequency band; or if the uplink frequency band used for downlink transmission is adjacent to another uplink frequency band used for downlink transmission, and the uplink frequency band is a lowest frequency band of all adjacent uplink frequency bands, the lowest-frequency part of the uplink frequency band has one guard frequency band.

Preferably, the UE determines a bandwidth of the guard frequency band and a bandwidth of the available frequency band in the uplink frequency band according to the following manner: if the uplink frequency band has two guard frequency bands, determining, by the network side device, a bandwidth in the uplink frequency band except a bandwidth double a minimum bandwidth value of the guard frequency band, to be a maximum value of the available frequency band, selecting, from all frequency bandwidths that can be supported by a system, a frequency bandwidth no greater than the maximum value of the available frequency band as the bandwidth of the available frequency band, and using a half of a bandwidth in the uplink frequency band except the bandwidth of the available frequency band as the bandwidth of the guard frequency band; or if the uplink frequency band has one guard frequency band, determining, by the network side device, a bandwidth in the uplink frequency band except a bandwidth with a minimum bandwidth value of the guard frequency band, to be a maximum value of the available frequency band, selecting, from all frequency bandwidths that can be supported by a system, a frequency bandwidth no greater than the maximum value of the available frequency band as the bandwidth of the available frequency band, and using a bandwidth in the uplink frequency band except the bandwidth of the available frequency band as the bandwidth of the guard frequency band.

Preferably, after the determining, by a UE, an uplink frequency band that includes a guard frequency band and an available frequency band and is used for downlink transmission, the method further includes: transmitting, by the UE according to scheduling of the network side device, uplink control information and/or a reference signal in another uplink frequency band except the uplink frequency band used for downlink transmission.

Preferably, after the determining, by a UE, an uplink frequency band that includes a guard frequency band and an available frequency band and is used for downlink transmission, the method further includes: when scheduling information of a downlink signal is transported in the uplink frequency band, receiving, by the UE, information according to a payload size corresponding to the determined width of the available frequency band.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a compact disc read-only memory (CD-ROM), an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some exemplary embodiments of this application have been described, persons skilled in the art can make changes and modifications to these embodiments once they learn the basic inventive concept. Therefore, the following claims are intended to be construed as to cover the exemplary embodiments and all changes and modifications falling within the scope of this application.

Obviously, a person skilled in the art can make various modifications and variations to this application without departing from the spirit and scope of this application. This application is intended to cover these modifications and variations provided that they fall within the scope of protection defined by the following claims and their equivalent technologies.

What is claimed is:

1. A method for downlink transmission, the method comprising:
   determining, by a network side device, an uplink frequency band used for downlink transmission, wherein the uplink frequency band includes a guard frequency band not used for transmission or reception and an available frequency band, the guard frequency band located in a higher-frequency part of the uplink frequency band, a lower-frequency part of the uplink frequency band, or both the higher-frequency part and the lower-frequency part; and
   sending, by the network side device to a user equipment (UE), a downlink signal including information according to a payload size corresponding to a determined width of the available frequency band when scheduling information of the downlink signal is transported via the uplink frequency band.

2. The method of claim 1, wherein the higher-frequency part and the lower-frequency part each has one guard frequency band when the uplink frequency band is used for downlink transmission and is not adjacent to another uplink frequency band used for downlink transmission.

3. The method of claim 2, wherein when the uplink frequency band has two guard frequency bands, the method further comprises determining, by the network side device, a guard bandwidth of the guard frequency band and an available bandwidth of the available frequency band by:
   determining, by the network side device, a maximum value of the available frequency band that is equal to an uplink bandwidth of the uplink frequency band minus double a minimum bandwidth of the guard frequency band;
   selecting, from all frequency bandwidths that can be supported by a system, a frequency bandwidth no greater than the maximum value as the available bandwidth of the available frequency band; and
   using for the guard bandwidth a half of the uplink bandwidth minus the available bandwidth.

4. The method of claim 1, wherein the higher-frequency part of the uplink frequency band has one guard frequency band when the uplink frequency band used for downlink transmission is adjacent to another uplink frequency band used for downlink transmission and when the uplink frequency band is a higher frequency band of all adjacent uplink frequency bands, and wherein the lower-frequency part of the uplink frequency band has one guard frequency band when the uplink frequency band used for downlink transmission is adjacent to another uplink frequency band used for downlink transmission and when the uplink frequency band is a lower frequency band of all adjacent uplink frequency bands.

5. The method of claim 4, wherein when the uplink frequency band has one guard frequency band, the method further comprises determining, by the network side device, a guard bandwidth of the guard frequency band and an available bandwidth of the available frequency band in the uplink frequency band by:
   determining, by the network side device, a maximum value of the available frequency band that is equal to an uplink bandwidth in the uplink frequency band minus a minimum bandwidth of the guard frequency band;
   selecting, from all frequency bandwidths that can be supported by a system, a frequency bandwidth no greater than the maximum value as the available bandwidth; and
   using for the guard bandwidth an uplink bandwidth in the uplink frequency band minus the available bandwidth.

6. A method for downlink transmission, the method comprising:
   determining, by a user equipment (UE), an uplink frequency band used for downlink transmission, wherein the uplink frequency band includes a guard frequency band not used for transmission or reception and includes an available frequency band, the guard frequency band located in a higher-frequency part of the uplink frequency band, a lower-frequency part of the uplink frequency band, or both the higher-frequency part and the lower-frequency part; and
   receiving, by the UE from a network side device, a downlink signal including information according to a payload size corresponding to a determined width of the available frequency band when scheduling information of the downlink signal is transported via the uplink frequency band.

7. The method of claim 6, wherein the higher-frequency part and the lower-frequency part each has one guard frequency band when the uplink frequency band is used for downlink transmission and is not adjacent to another uplink frequency band that is used for downlink transmission.

8. The method of claim 7, wherein when the uplink frequency band has two guard frequency bands, the method further comprises:
   determining, by the UE, a guard bandwidth of the guard frequency;
   determining, by the UE, a maximum value of the available frequency band that is equal to an uplink bandwidth of the uplink frequency band minus double a minimum bandwidth of the guard frequency band;
   selecting, from all frequency bandwidths that can be supported by a system, a frequency bandwidth no greater than the maximum value as an available bandwidth of the available frequency band; and
   using for the guard bandwidth a half of the uplink bandwidth minus the available bandwidth as the bandwidth.

9. The method of claim 6, wherein the higher-frequency part of the uplink frequency band has one guard frequency band when the uplink frequency band used for downlink transmission is adjacent to another uplink frequency band used for downlink transmission and when the uplink frequency band is a higher frequency band of all adjacent uplink frequency bands, and wherein the lower-frequency part of the uplink frequency band has one guard frequency band when the uplink frequency band used for downlink transmission is adjacent to another uplink frequency band used for downlink transmission and when the uplink frequency band is a lower frequency band of all adjacent uplink frequency bands.

10. The method of claim 9, wherein when the uplink frequency band has one guard frequency band, the method further comprises determining, by the UE, a guard bandwidth of the guard frequency band and an available bandwidth of the available frequency band in the uplink frequency band by:

determining, by the UE, a maximum value of the available frequency band that is equal to an uplink bandwidth in the uplink frequency band minus a minimum bandwidth of the guard frequency band;

selecting, from all frequency bandwidths that can be supported by a system, a frequency bandwidth no greater than the maximum value as the available bandwidth; and using for the guard bandwidth an uplink bandwidth in the uplink frequency band minus the available bandwidth.

11. A communication apparatus comprising:

a processor configured to determine an uplink frequency band used for downlink transmission, wherein the uplink frequency band includes a guard frequency band not used for transmission or reception and includes an available frequency band, the guard frequency band located in a higher-frequency part of the uplink frequency band, a lower-frequency part of the uplink frequency band, or both the higher-frequency part and the lower-frequency part; and a transceiver coupled to the processor and configured to:
receive and send data under control of the processor; and send a downlink signal including information according to a payload size corresponding to a determined width of the available frequency band when scheduling information of the downlink signal is transported via the uplink frequency band.

12. The communication apparatus of claim 11, wherein the higher-frequency part and the lower-frequency part each has one guard frequency band when the uplink frequency band used for downlink transmission is not adjacent to another uplink frequency band used for downlink transmission, wherein the higher-frequency part has one guard frequency band when the uplink frequency band used for downlink transmission is adjacent to another uplink frequency band used for downlink transmission and when the uplink frequency band is a higher frequency band of all adjacent uplink frequency bands, and wherein the lower-frequency part has one guard frequency band when the uplink frequency band used for downlink transmission is adjacent to another uplink frequency band used for downlink transmission and when the uplink frequency band is a lower frequency band of all adjacent uplink frequency bands.

13. The communication apparatus of claim 11, wherein when the uplink frequency band has two guard frequency bands, the processor is further configured to determine a guard bandwidth of the guard frequency band and an available bandwidth of the available frequency band by:

determining a maximum value of the available frequency band that is equal to an uplink bandwidth in the uplink frequency band minus double a minimum bandwidth value of the guard frequency band;

selecting, from all frequency bandwidths that can be supported by a system, a frequency bandwidth no greater than the maximum value as the available bandwidth of the available frequency band; and using for the guard bandwidth a half of the uplink bandwidth minus the available bandwidth, and wherein when the uplink frequency band has one guard frequency band, the processor is further configured to determine the guard bandwidth and the available bandwidth by:

determining that the maximum value is equal to the uplink bandwidth minus a minimum bandwidth of the guard frequency band;

selecting, from all frequency bandwidths that can be supported by a system, a frequency bandwidth no greater than the maximum value as the available bandwidth; and using for the guard bandwidth the uplink bandwidth minus the available bandwidth.

14. The communication apparatus of claim 11, wherein the higher-frequency part and the lower-frequency part each has one guard frequency band when the uplink frequency band is used for the downlink transmission and is not adjacent to another uplink frequency band used for the downlink transmission.

15. The communication apparatus of claim 11, wherein when the uplink frequency band has two guard frequency bands, the processor is further configured to determine a guard bandwidth of the guard frequency band and an available bandwidth of the available frequency band by:

determining a maximum value of the available frequency band that is equal to an uplink bandwidth of the uplink frequency band minus double a minimum bandwidth of the guard frequency band;

selecting, from all frequency bandwidths that can be supported by a system, a frequency bandwidth no greater than the maximum value as the available bandwidth of the available frequency band; and using for the guard bandwidth a half of the uplink bandwidth minus the available bandwidth.

16. A communication apparatus comprising:

a processor configured to determine an uplink frequency band used for downlink transmission, wherein the uplink frequency band includes a guard frequency band not used for transmission or reception and includes an available frequency band, the guard frequency band located in a higher-frequency part of the uplink frequency band, a lower-frequency part of the uplink frequency band, or both the higher-frequency part and the lower-frequency part; and a transceiver coupled to the processor and configured to:
receive and send data under control of the processor; and receive a downlink signal including information according to a payload size corresponding to a determined width of the available frequency band when scheduling information of the downlink signal is transported via the uplink frequency band.

17. The communication apparatus of claim 16, wherein the higher-frequency part and the lower-frequency part each has one guard frequency band when the uplink frequency band used for downlink transmission is not adjacent to another uplink frequency band used for downlink transmission, wherein the higher-frequency part has one guard frequency band when the uplink frequency band used for downlink transmission is adjacent to another uplink frequency band used for downlink transmission and when the uplink frequency band is a highest frequency band of all adjacent uplink frequency bands, and wherein the lower-frequency part has one guard frequency band when the uplink frequency band used for downlink transmission is adjacent to another uplink frequency band used for downlink transmission and when the uplink frequency band is a lower frequency band of all adjacent uplink frequency bands.

18. The communication apparatus of claim 16, wherein when the uplink frequency band has two guard frequency bands, the processor is further configured to determine a guard bandwidth of the guard frequency band and an available bandwidth of the available frequency band by:

determining a maximum value of the available frequency band that is equal to an uplink bandwidth in the uplink frequency band minus double a minimum bandwidth value of the guard frequency band;

selecting, from all frequency bandwidths that can be supported by a system, a frequency bandwidth no greater than the maximum value as the available bandwidth of the available frequency band; and using for the guard bandwidth a half of the uplink bandwidth minus the available bandwidth, and wherein when the uplink frequency band has one guard frequency band, the processor is further configured to determine the guard bandwidth and the available bandwidth by:

determining, that the maximum value is equal to the uplink bandwidth minus a minimum bandwidth of the guard frequency band;

selecting, from all frequency bandwidths that can be supported by a system, a frequency bandwidth no greater than the maximum value as the available bandwidth; and using for the guard bandwidth the uplink bandwidth minus the available bandwidth.

19. The communication apparatus of claim 16, wherein the higher-frequency part and the lower-frequency part each has one guard frequency band when the uplink frequency band is used for the downlink transmission and is not adjacent to another uplink frequency band used for the downlink transmission.

20. The communication apparatus of claim 16, wherein when the uplink frequency band has two guard frequency bands, the processor further configured to:

determine a guard bandwidth of the guard frequency;

determine a maximum value of the available frequency band that is equal to an uplink bandwidth of the uplink frequency band minus double a minimum bandwidth of the guard frequency band;

select, from all frequency bandwidths that can be supported by a system, a frequency bandwidth no greater than the maximum value as an available bandwidth of the available frequency band; and use for the guard bandwidth a half of the uplink bandwidth minus the available bandwidth as the bandwidth.

* * * * *

UNITED STATES PATENT AND TRADEMARK OFFICE
CERTIFICATE OF CORRECTION

PATENT NO.          : 10,237,748 B2
APPLICATION NO.     : 15/203940
DATED               : March 19, 2019
INVENTOR(S)         : Ronghui Wen et al.

Page 1 of 1

It is certified that error appears in the above-identified patent and that said Letters Patent is hereby corrected as shown below:

On the Title Page

Page (2), Item (56), OTHER PUBLICATIONS, Line 7: "Form" should read "From"

Signed and Sealed this
Fourth Day of June, 2019

Andrei Iancu
*Director of the United States Patent and Trademark Office*